United States Patent
Gomi

(10) Patent No.: US 7,924,334 B2
(45) Date of Patent: Apr. 12, 2011

(54) SOLID-STATE IMAGING APPARATUS AND IMAGING SYSTEM USING THE SAME

(75) Inventor: Yuichi Gomi, Hachioji (JP)

(73) Assignee: Olympus Corporation, Tokyo (JP)

( * ) Notice: Subject to any disclaimer, the term of this patent is extended or adjusted under 35 U.S.C. 154(b) by 503 days.

(21) Appl. No.: 12/128,216

(22) Filed: May 28, 2008

(65) Prior Publication Data

US 2008/0297637 A1    Dec. 4, 2008

(30) Foreign Application Priority Data

May 29, 2007    (JP) .................................. 2007-141233

(51) Int. Cl.
*H04N 3/14* (2006.01)
*H04N 5/335* (2011.01)

(52) U.S. Cl. ....................................................... 348/308

(58) Field of Classification Search ........................ None
See application file for complete search history.

(56) References Cited

U.S. PATENT DOCUMENTS

| | | | |
|---|---|---|---|
| 6,900,485 B2 * | 5/2005 | Lee | 257/292 |
| 6,930,338 B2 * | 8/2005 | Lee | 257/292 |
| 7,030,357 B2 * | 4/2006 | Lee | 250/208.1 |
| 7,842,985 B2 * | 11/2010 | Lim | 257/291 |

FOREIGN PATENT DOCUMENTS

| | | | |
|---|---|---|---|
| JP | 2003-87657 A | 3/2003 | |
| JP | 2004-165467 A | 6/2004 | |

\* cited by examiner

*Primary Examiner* — Justin P Misleh
(74) *Attorney, Agent, or Firm* — Westerman, Hattori, Daniels & Adrian, LLP

(57) ABSTRACT

A solid-state imaging apparatus including: a pixel section having pixels arranged into a matrix, each pixel containing an electric charge retaining section with a first accumulation capacitance for retaining a signal electric charge, a photoelectric conversion device with a second accumulation capacitance greater than the first accumulation capacitance where a light signal is converted into signal electric charges and then accumulated, a transfer means for controlling a transfer of the signal electric charges from the photoelectric conversion device to the electric charge retaining section, a signal amplification means for amplifying the signal electric charges retained at the electric charge retaining section and outputting them as a pixel signal, and a reset means for controlling a connection between the photoelectric conversion device and a pixel power supply; a horizontal and vertical scanning means for outputting the pixel signal; and a control section for, after transfer of the signal electric charges by the transfer means, executing the connection between the photoelectric conversion device and the pixel power supply by the reset means before a start of an exposure.

3 Claims, 13 Drawing Sheets

(BEFORE READING SIGNAL CHARGE)

(AFTER SIGNAL CHARGE TRANSFER OF 1ST TIME)

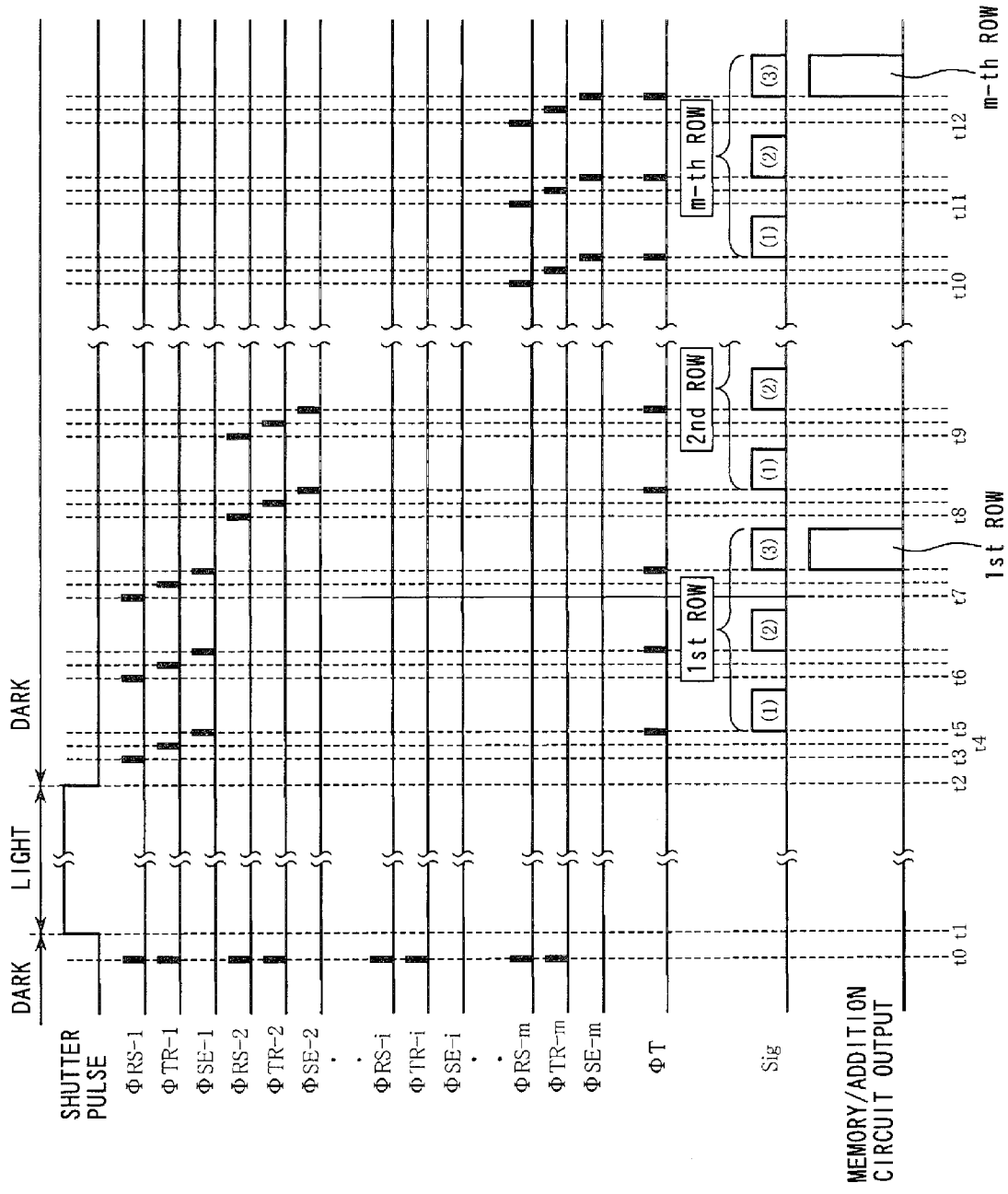

US 7,924,334 B2

SOLID-STATE IMAGING APPARATUS AND IMAGING SYSTEM USING THE SAME

This application claims benefit of Japanese Patent Application No. 2007-141233 filed in Japan on May 29, 2007 the contents of which are incorporated by this reference.

BACKGROUND OF THE INVENTION

The present invention relates to solid-state imaging apparatus capable of preventing a degradation of sensitivity and a saturation based on the fining of pixel and to imaging system using the same.

A prior-art solid-state imaging apparatus using MOS transistor is constructed as shown in FIG. 1. Referring to FIG. 1, what is denoted by 100 is a pixel section which in this case is shown as constructed by arranging pixels 101 indicated by P11 to Pnm into n columns by m rows. 200 is a vertical scanning circuit for selecting pixels by the unit of row and causing pixel signal of the pixels of the selected row to be outputted to a vertical signal line 50 which is provided for each column. 400 is a horizontal read circuit by which the pixel signals corresponding to one row selected by the vertical scanning circuit 200 and outputted to the vertical signal line 50 are fetched through a fetch switch 40 controlled by fetch pulse φT so as to output signal of the pixels of that row from an output terminal 401 in time sequence in order of their arrangement in the horizontal direction. 60 is a current supply connected to the vertical signal line 50.

The construction of pixel 101 used in this solid-state imaging apparatus will now be described by way of FIG. 2. Referring to FIG. 2, PD is a photodiode (photoelectric conversion device), and FD is an electric charge retaining section consisting of a capacitor device for detecting signal electric charges generated and accumulated at the photodiode PD. Here, the electric charge retaining section is shielded from light. M1 is a transfer transistor for transferring a signal of the photodiode PD to the electric charge retaining section FD, which is controlled by transfer pulse φTR-i. M3 is an amplification transistor which forms a source follower amplifier with the current supply 60 provided on the vertical signal line 50. The signal of the electric charge retaining section FD is amplified by the amplification transistor M3 and is outputted to the vertical signal line 50 through a select transistor M4. The select transistor M4 is controlled by select pulse φSE-i. M2 is a reset transistor controlled by reset pulse φRS-i, for controlling connection between the input section of electric charge retaining section FD as well as of amplification transistor M3 and a pixel power supply VDD.

Here, select pulse φSE-i, transfer pulse φTR-i, and reset pulse φRS-i are outputted from the vertical scanning circuit 200 shown in FIG. 1 and are indicated by φSE-1 to φSE-m, φTR-1 to φTR-m, and φRS-1 to φRS-m in FIG. 1.

Before describing operation of the solid-state imaging apparatus shown in FIG. 1, operation of the pixel shown in FIG. 2 will be described below with reference to a timing chart shown in FIG. 3 and potential diagram of each section of photodiode PD, transfer transistor M1, and reset transistor M2 shown in FIGS. 4A to 4D. Referring to the timing chart of FIG. 3, it is supposed that, at point in time t1, signal electric charges generated by a light signal is accumulated as shown in FIG. 4A at photodiode PD of the pixels 101 on selected one horizontal line. When "H"-level reset pulse φRS-i for turning ON the reset transistor M2 is given at time t1, the electric charge retaining section FD is reset to the pixel power supply VDD as shown in FIG. 4B.

Next the reset transistor M2 is turned OFF, and "H"-level transfer pulse φTR-i for turning ON transfer transistor M1 of the pixels of the selected row is given at time t2. The signal electric charges accumulated at photodiode PD is thereby transferred to the electric charge retaining section FD as shown in FIG. 4C. After that, the electric charge retaining section FD is retained at a value based on light signal even when the transfer control pulse φTR-i is brought to "L" level to turn OFF the transfer transistor M1. On the other hand, all of the signal electric charges accumulated of the photodiode PD is transferred to the electric charge retaining section FD so that it attains an empty condition of signal electric charge as shown in FIG. 4D, i.e., reset condition of photodiode PD. The photodiode PD then starts accumulation of signal electric charges generated thereafter by light signal.

The select pulse φSE-i then is driven to "H" level at time t3 so that pixel signal obtained by amplifying signal of the charge retaining section FD is outputted to the vertical signal line 50. After that, pixel signals are outputted from the output terminal 401 through the fetch switch 40 and horizontal signal read circuit 400.

An operation of the solid-state imaging apparatus shown in FIG. 1 will now be described by way of a timing chart shown in FIG. 5. The reset pulse φRS-1 of the first row is outputted at time t1 from the vertical scanning circuit 200 to reset the electric charge retaining sections FD of the first row. Next at time t2, transfer pulse φTR-1 of the first row is outputted from the vertical scanning circuit 200 to transfer signal electric charges accumulated at the photodiode PD of the first row to the electric charge retaining section FD. Subsequently at time t3, select pulse φSE-1 of the first row is outputted from the vertical scanning circuit 200 to output pixel signals of the first row to the vertical signal line 50. At this time, fetch pulse φT is concurrently driven to "H" level so that the pixel signals outputted to the vertical signal line 50 are fetched to the horizontal read circuit 400 and are outputted from the output terminal 401 at and after time t4 in time sequence in order of their arrangement in the horizontal direction. In FIG. 5, this signal of the output terminal 401 is indicated by Sig.

The accumulation period of pixel signal of the first row outputted here is the period indicated by T1 in FIG. 5, i.e. from time t0 at which the transfer of signal electric charges is effected to reset photodiode PD in the previous frame to time t2 at which it is transferred in current frame. A similar operation as for the first row is also effected for the rows of the second and after so that the pixel signals of all pixels of the pixel section 100 are outputted from the output terminal 401.

Further of thus described solid-state imaging apparatus using MOS transistor, construction has been proposed to improve its characteristic by providing additional device within the pixel shown in FIG. 2. Japanese Patent Application Laid-Open 2003-87657 and Japanese Patent Application Laid-Open 2004-165467 for example disclose the providing of a storage device and/or CCD respectively for each pixel to avoid an image distortion which occurs when an image of moving object is taken due to the fact that the electric charge accumulation time, i.e. charge accumulation start timing and charge accumulation end timing are different from one line to another.

SUMMARY OF THE INVENTION

In accordance with a first aspect of the invention, there is provided a solid-state imaging apparatus including: a pixel section having pixels arranged into a matrix, each pixel containing an electric charge retaining section with a first accumulation capacitance for retaining a signal electric charge, a photoelectric conversion device with a second accumulation capacitance greater than the first accumulation capacitance where a light signal is converted into signal electric charges and then accumulated, a transfer means for controlling a transfer of the signal electric charges from the photoelectric conversion device to the electric charge retaining section, a signal amplification means for amplifying the signal electric charges retained at the electric charge retaining section and outputting them as a pixel signal, and a reset means for controlling a connection between the photoelectric conversion device and a pixel power supply; a horizontal and vertical scanning means for outputting the pixel signal; and a control section for, after transfer of the signal electric charges by the transfer means, executing the connection between the photoelectric conversion device and the pixel power supply by the reset means before a start of an exposure. A first embodiment corresponds to an embodiment of the solid-state imaging apparatus according to the first aspect.

In a second aspect of the invention, there is provided an imaging system including: the solid-state imaging apparatus according to the first aspect; a shutter mechanism section for executing a switching of the pixel section between an exposure condition and a light-shielded condition of an object light; and an addition control means for controlling the transfer means in the light-shielded condition to cause the transfer to the electric charge retaining section of signal electric charges accumulated at the photoelectric conversion device at the time of the exposure condition and a output operation of the pixel signal to be effected for a plurality of times for each row and for generating a cumulated pixel signal where the pixel signals outputted over the plurality of times are cumulatively added. A second embodiment corresponds to an embodiment of the imaging system according to the second aspect.

In a third aspect of the invention, the imaging system according to the second aspect further includes a gain setting means for setting gain on the pixel signal, wherein the addition control means sets in accordance with the set gain the number of times of the transfer of signal electric charges to the electric charge retaining section and output operation of the pixel signal to be effected over the plurality of times. The second embodiment corresponds to an embodiment of the imaging system according to the third aspect.

BRIEF DESCRIPTION OF THE DRAWINGS

FIG. 16 is a timing chart for explaining an operation of the imaging system shown in FIG. 13.

DESCRIPTION OF THE PREFERRED EMBODIMENTS

Some embodiments of the solid-state imaging apparatus according to the invention and the imaging system using the same will be described below with reference to the drawings.

Embodiment 1

Figure 1:
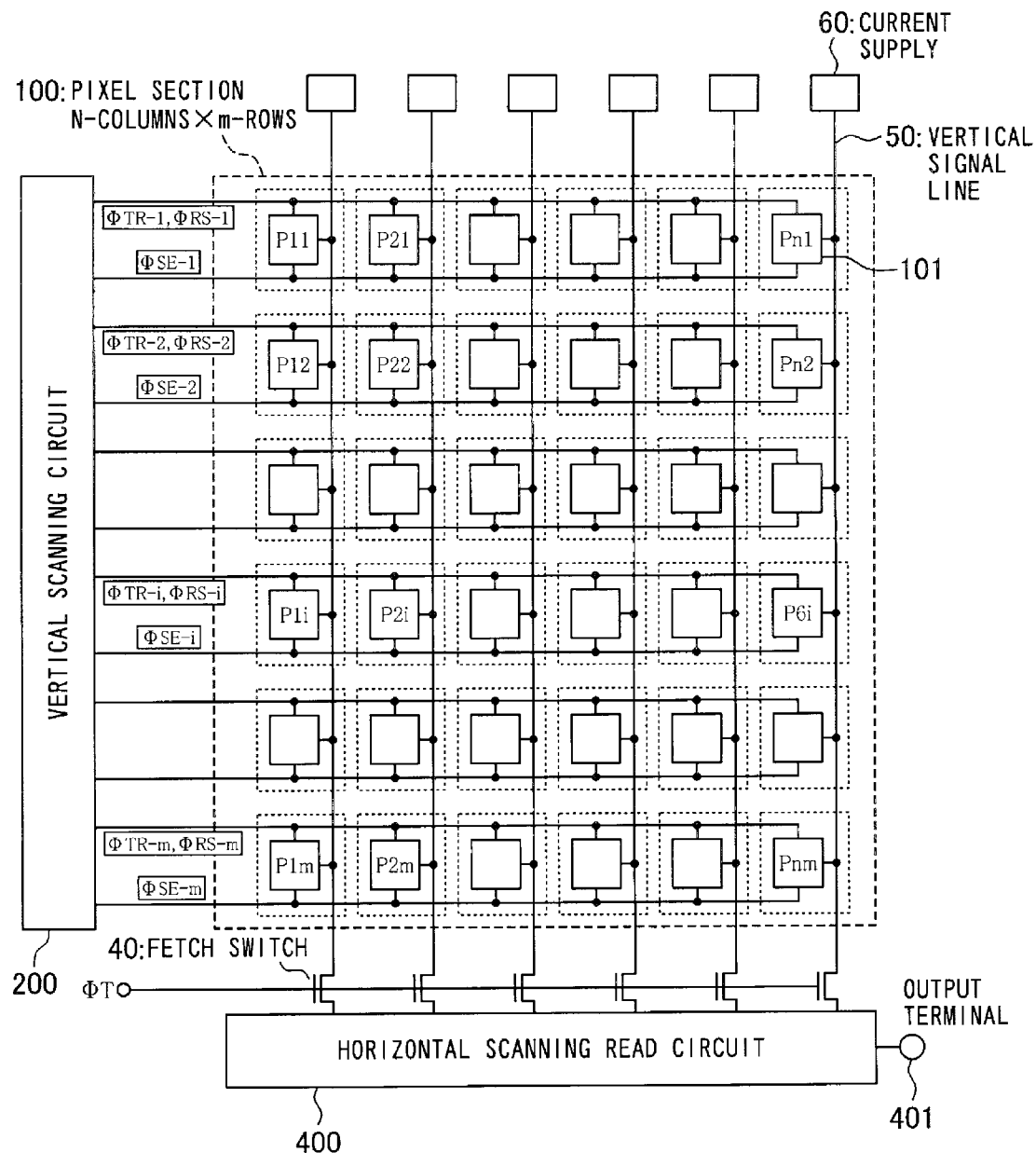
FIG. 1 is a block diagram showing a construction of a prior-art solid-state imaging apparatus using MOS transistor.
Figure 2:
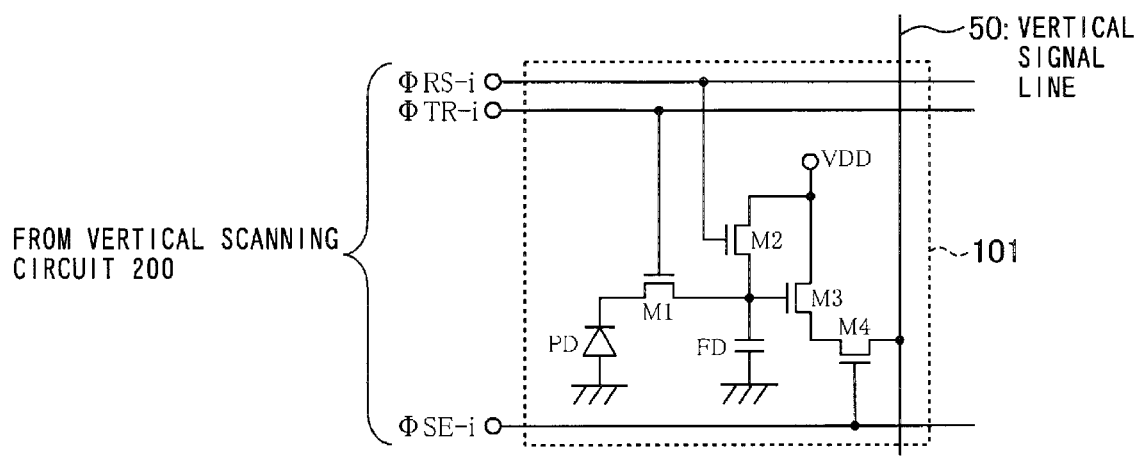
FIG. 2 is a circuit diagram showing a construction of pixel in the prior-art solid-state imaging apparatus shown in FIG. 1.
Figure 3:
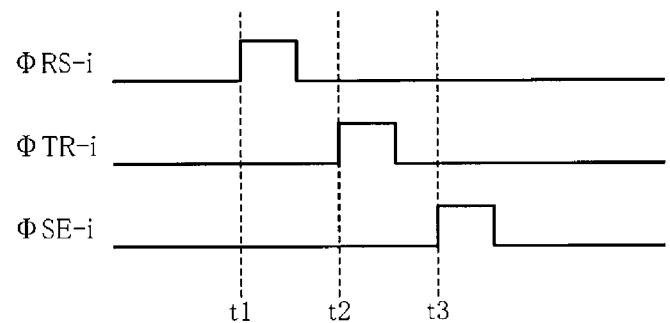
FIG. 3 is a timing chart for explaining an operation of the pixel shown in FIG. 2.
Figure 4A:
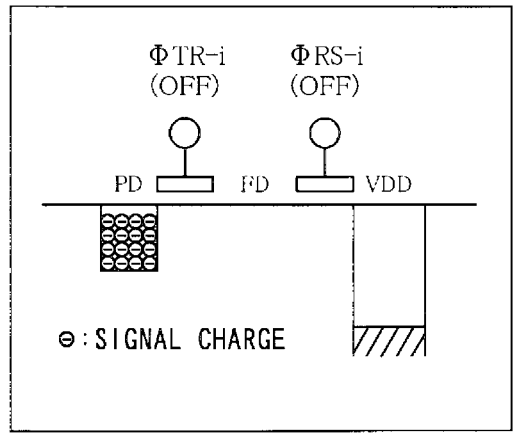
FIGS. 4A to 4D each show a potential condition of each section to explain the operation of the pixel shown in FIG. 3.
Figure 4B:
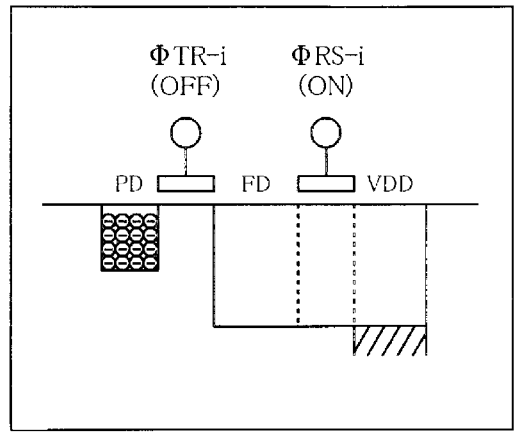
Figure 4C:
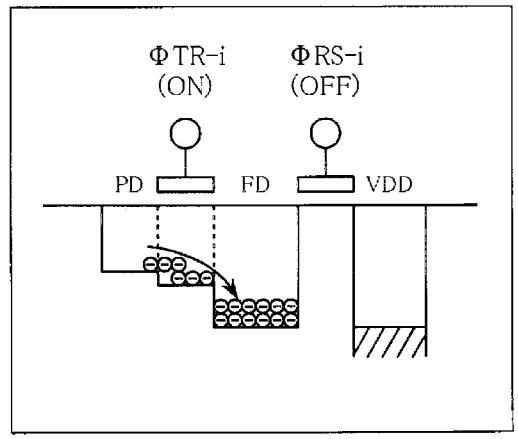
Figure 4D:
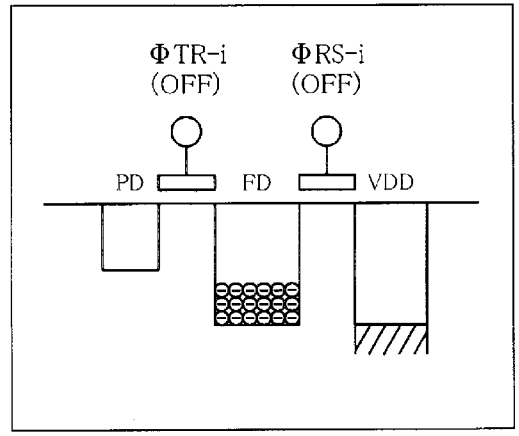
Figure 5:
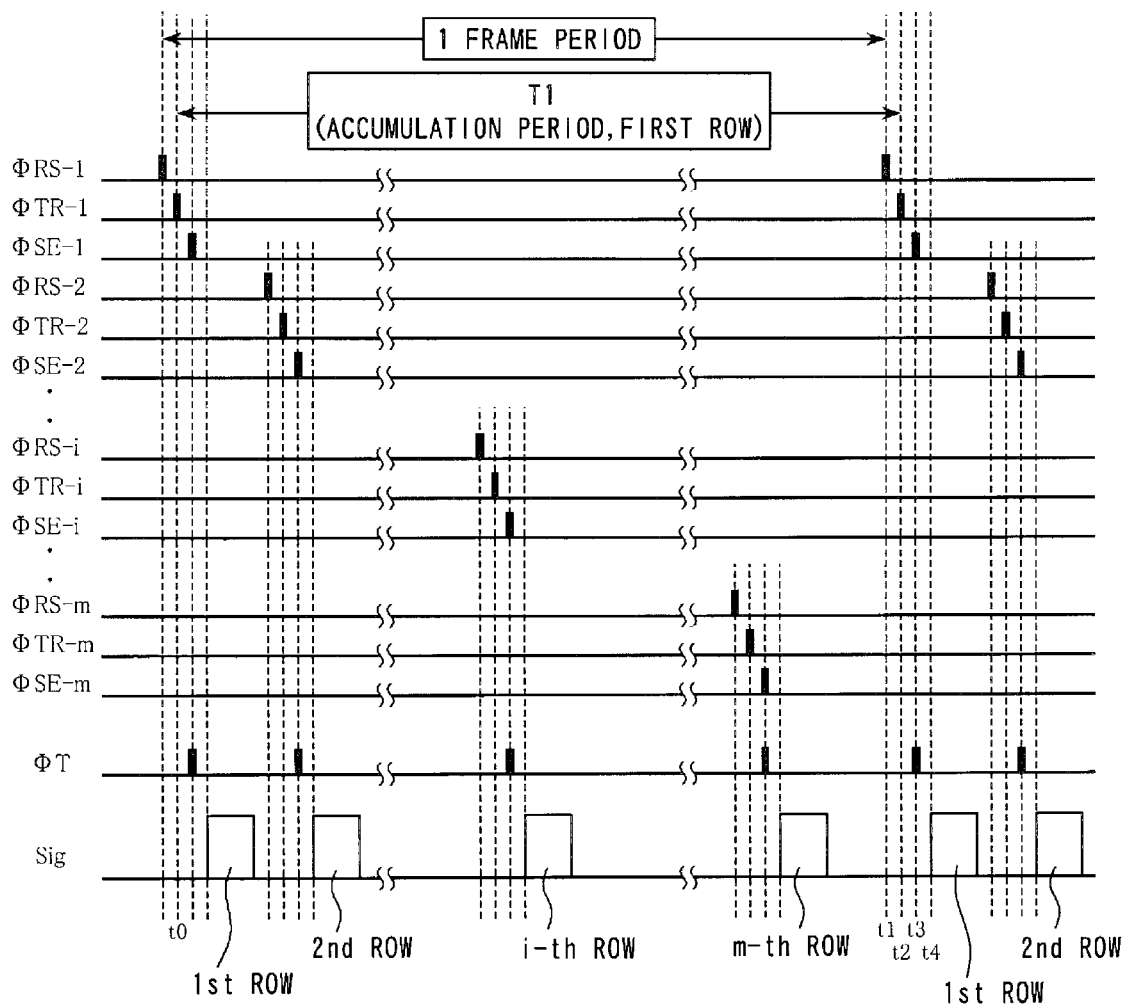
FIG. 5 is a timing chart for explaining an operation of the prior-art solid-state imaging apparatus shown in FIG. 1.
Figure 6:
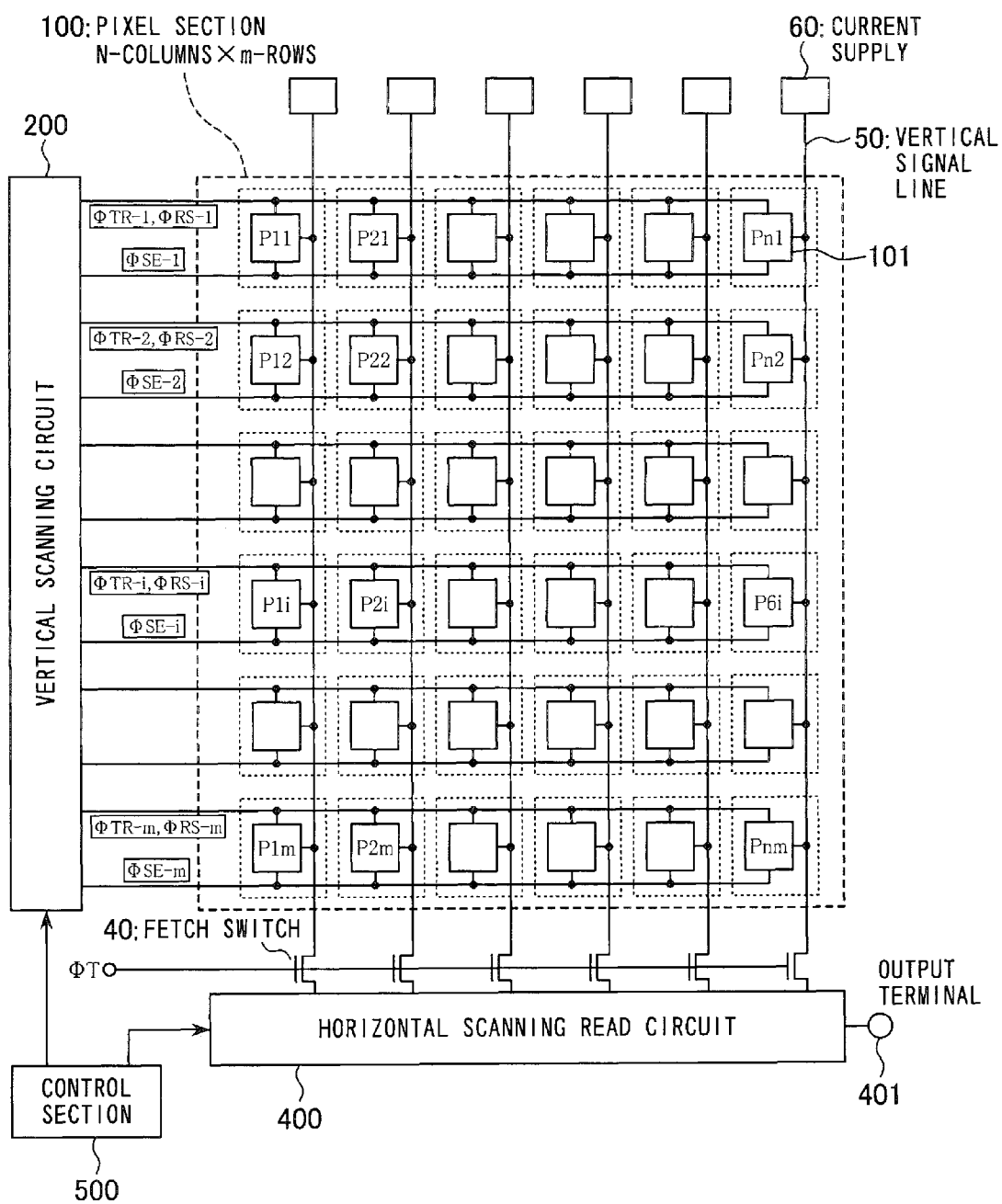
FIG. 6 is a block diagram showing a construction of a first embodiment of the solid-state imaging apparatus according to the invention.
Figure 7:
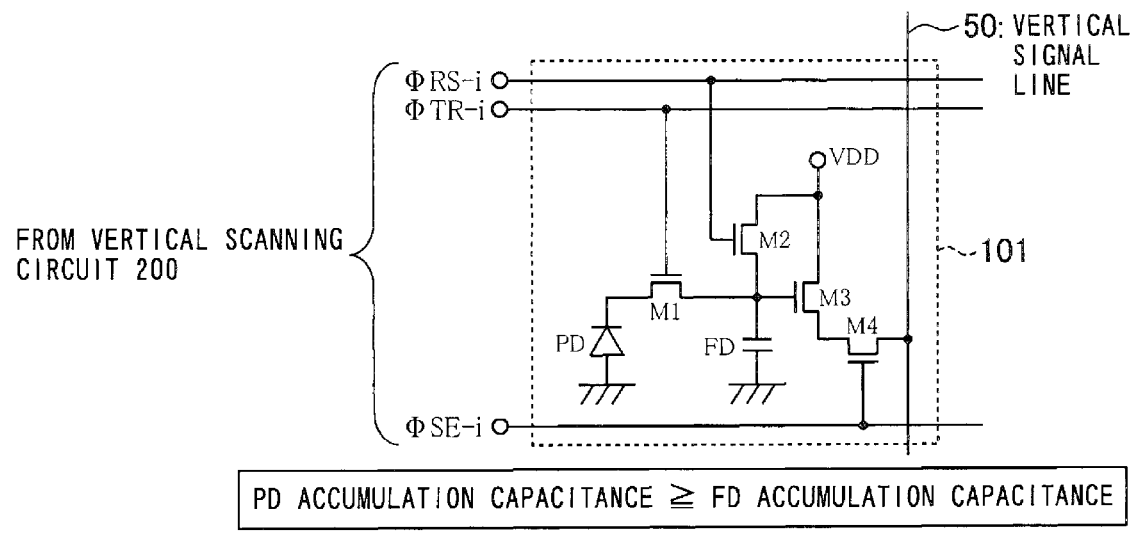
FIG. 7 is a circuit diagram showing a construction of pixel in the solid-state imaging apparatus according to the first embodiment shown in FIG. 6.

A first embodiment of the solid-state imaging apparatus according to the invention will now be described. FIG. 6 is a block diagram showing construction of the solid-state imaging apparatus according to the first embodiment, which is identical to the construction of the prior-art solid-state imaging apparatus shown in FIG. 1 except the construction of pixel and except that a control section 500 for controlling operation of the vertical scanning circuit 200 and horizontal signal read circuit 400 is provided. The components in the following but the pixel construction and the control section 500 will be denoted by the same reference numerals as those for the prior-art solid-state imaging apparatus shown in FIG. 1, and a detailed description thereof will be omitted. FIG. 7 shows a construction of pixel used in the solid-state imaging apparatus of the present embodiment. The pixel construction shown in FIG. 7 is different from the pixel construction of the prior-art example in that the electric charge accumulation capacitance of photodiode PD is greater than the electric charge accumulation capacitance of the electric charge retaining section FD. The construction of the rest is identical to the prior-art pixel construction, and will not be described in detail.

Figure 8:
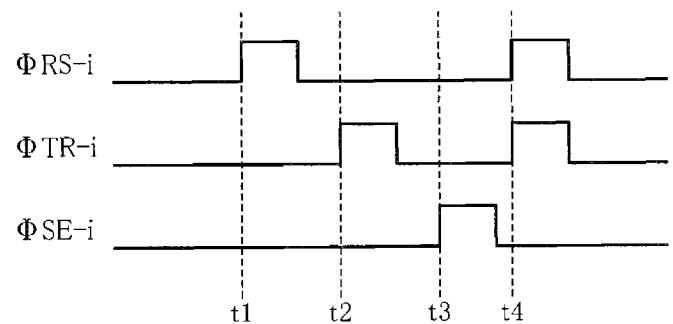
FIG. 8 is a timing chart for explaining an operation of the pixel shown in FIG. 7.
Figure 9A:
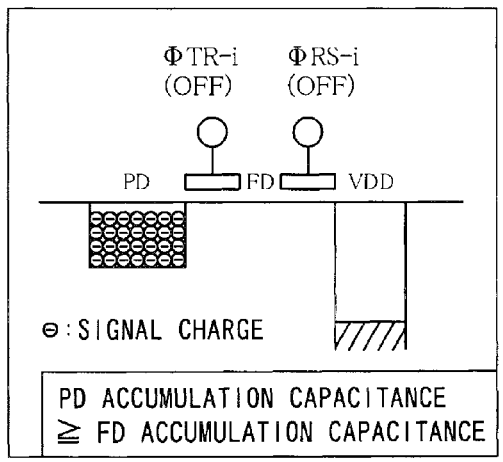
FIGS. 9A to 9E each show a potential condition of each section to explain an operation of the pixel shown in FIG. 7.
Figure 9B:
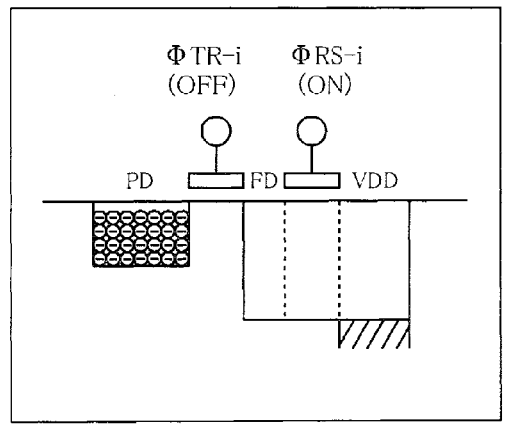

Before describing operation of the solid-state imaging apparatus of the present embodiment, an operation of the pixel shown in FIG. 7 will now be described with reference to a timing chart shown in FIG. 8 and diagrams showing potential condition of each section of photodiode PD, transfer transistor M1, and reset transistor M2 shown in FIGS. 9A to 9E. At point in time t1 in the timing chart of FIG. 8, it is supposed that signal electric charges generated by light signal as shown in FIG. 9A are accumulated at photodiode PD of the pixels on selected one horizontal line. When "H" level reset pulse φRS-i for turning ON the reset transistor M2 is given at time t1, the electric charge retaining section FD is reset to the pixel power supply VDD as shown in FIG. 9B.

Figure 9C:
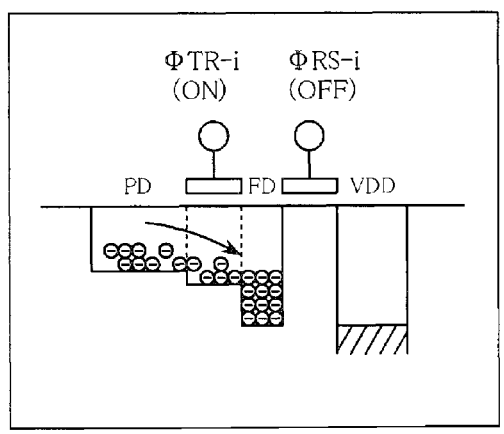

Next the reset transistor M2 is turned OFF, and "H" level transfer pulse φTR-i for turning ON transfer transistor M1 of the pixels of the selected row is given at time t2. The signal electric charges accumulated at photodiode PD are thereby transferred to the electric charge retaining section FD as shown in FIG. 9C. It is now possible to obtain an output signal corresponding to light signal from the source of the amplification transistor.

After that, if the electric charges accumulated at photodiode PD are smaller than the amount that can be accumulated at the electric charge retaining section FD, all of the signal electric charges accumulated at photodiode PD is transferred to the electric charge retaining section FD similarly to the prior-art example so that an empty condition of signal electric charge is attained. It is then possible for photodiode PD to start accumulation of signal electric charges subsequently generated by light signal.

Figure 9D:
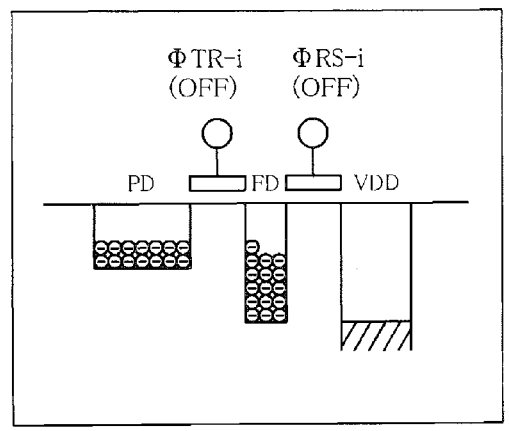
Figure 9E:
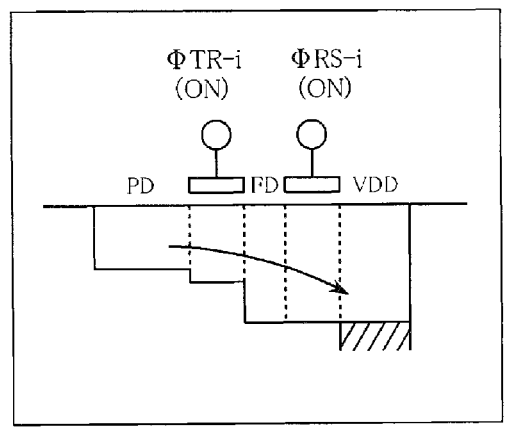

In the present embodiment, however, since the electric charge accumulation capacitance of photodiode PD is greater than the electric charge accumulation capacitance of the electric charge retaining section FD, the transferring of all of the signal charges accumulated at photodiode PD to the electric charge retaining section FD is in some cases impossible so that some electric charges remain at photodiode PD as shown in FIG. 9D. For this reason, select pulse φSE-i is driven to "H" level at time t3 so as to output a pixel signal obtained by amplification of signal of the electric charge retaining section FD to the vertical signal line 50. The pixel signal is fetched to the horizontal signal read circuit 400 through the fetch switch 40. Subsequently at time t4, the reset pulse φRS-i and transfer pulse φTR-i are driven to "H" level. By this operation, all of the electric charges left at photodiode PD is discharged from the pixel power supply VDD as shown in FIG. 9E. Subsequently, the pixel signal taken to the horizontal signal read circuit 400 is outputted from the output terminal 401.

Figure 10:
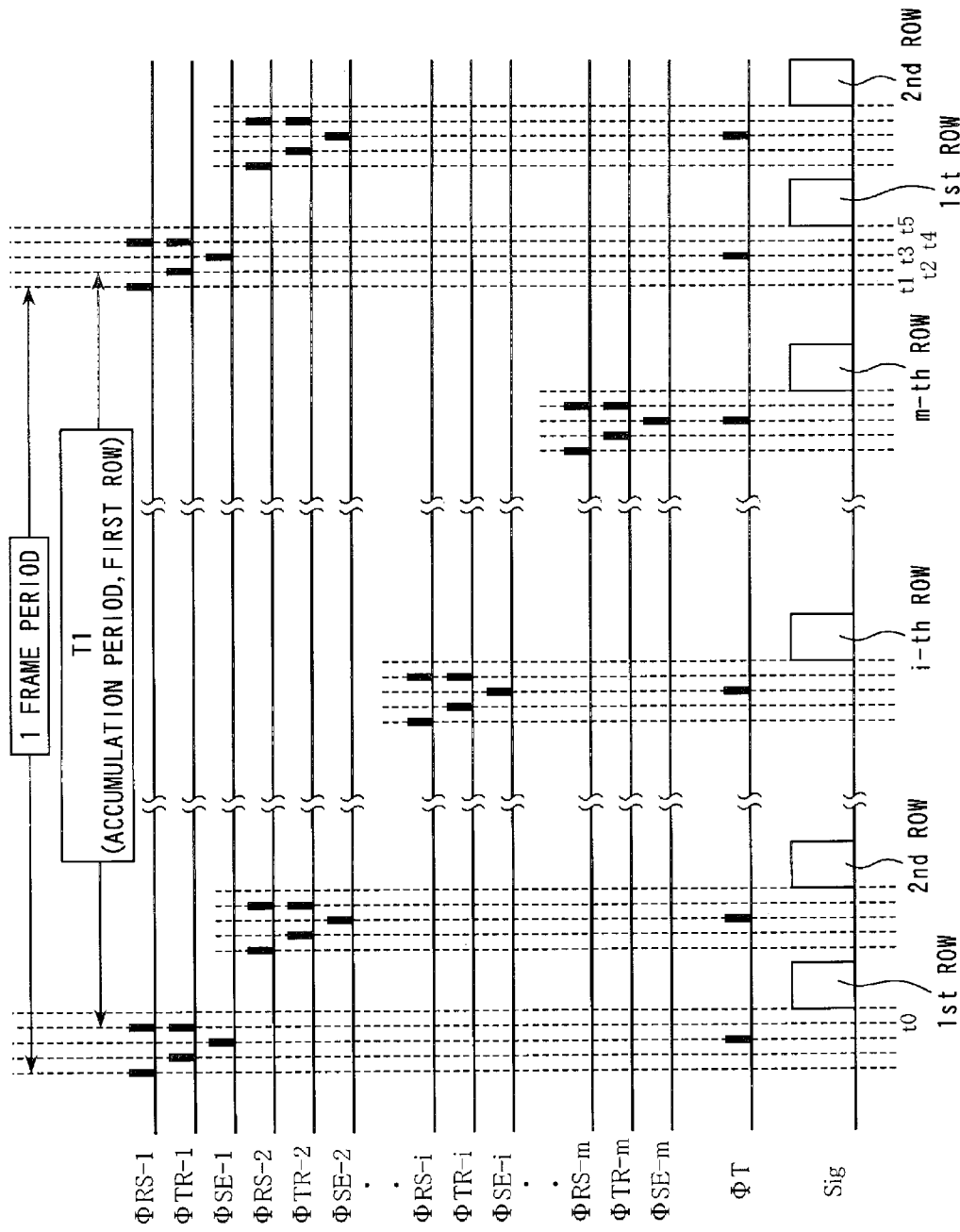
FIG. 10 is a timing chart for explaining a total operation of the solid-state imaging apparatus according to the first embodiment shown in FIG. 6.

An overall operation of the solid-state imaging apparatus of the present embodiment will now be described by way of a timing chart shown in FIG. 10. The reset pulse φRS-1 of the first row is outputted at time t1 from the vertical scanning circuit 200 to reset the electric charge retaining section FD of the first row. Next at time t2, transfer pulse φTR-1 of the first row is outputted from the vertical scanning circuit 200 to transfer signal charges accumulated at the photodiode PD of the first row to the electric charge retaining section FD. Subsequently at time t3, select pulse φSE-1 of the first row is outputted from the vertical scanning circuit 200 to output pixel signals of the first row to the vertical signal line 50. At this time, fetch pulse φT is concurrently driven to "H" level so that the pixel signals outputted onto the vertical signal line 50 are fetched to the horizontal read circuit 400. Subsequently at time t4, the reset pulse φRS-1 and transfer pulse φTR-1 of the first row are concurrently outputted from the vertical scanning circuit 200 to connect between the pixel power supply VDD and photodiode PD so as to reset photodiode PD. After time t5, then, the pixel signals are outputted from the output terminal 401 in time sequence in their horizontal order of arrangement. In FIG. 10, this signal of the output terminal 401 is indicated by Sig.

The accumulation period of pixel signal of the first row outputted in this case is the period indicated by T1 in FIG. 10, i.e. from time t0 at which photodiode PD is reset in the previous frame by connecting between pixel power supply VDD and photodiode PD to time t2 at which it is transferred in current frame. A similar operation as for the first row is also effected for rows of the second and after so that the pixel signals of all pixels of the pixel section 100 are outputted from the output terminal.

As the above, even when the electric charge accumulation capacitance of photodiode PD is greater than the electric charge accumulation capacitance of the electric charge retaining section FD for detecting signal charges, the residual electric charges at photodiode PD, i.e. afterimage can be eliminated by connecting the photodiode PD to the pixel power supply VDD to reset it after outputting the pixel signal. Accordingly, since the area of photodiode PD can be made larger to a possible extent without being limited by balance with the electric charge accumulation capacitance of the electric charge retaining section, the solid-state imaging apparatus is obtained as having high sensitivity.

Figure 11:
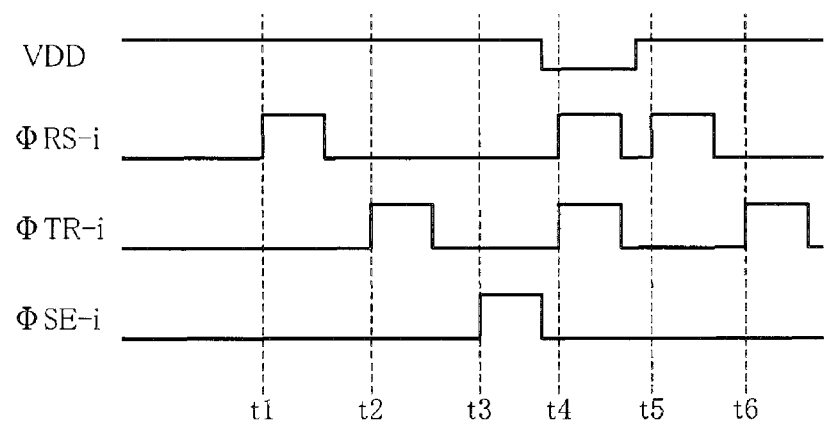
FIG. 11 is a timing chart for explaining another operation method of the pixel shown in FIG. 7.

It should be noted that the resetting of photodiode PD in the above embodiment can be effected also by a method as shown in a timing chart of FIG. 11. The method shown in FIG. 11 up to the outputting of pixel signal to the vertical signal line 50 at time t3 is similar to the timing shown in FIG. 8 and will not be described. In the resetting of photodiode PD after the outputting of pixel signal to the vertical signal line 50 in the method shown in FIG. 11, the level of the pixel power supply VDD is at first lowered, and, at time t4, the transfer transistor M1 and the reset transistor M2 are concurrently turned ON. A temporary reset operation is effected by thus connecting between the photodiode PD and the pixel power supply VDD. The level of pixel power supply VDD at this time is set so that a small amount of electric charges remains at the photodiode PD.

Subsequently, the level of the pixel power supply VDD is returned to the original level, and only the reset transistor M2 is turned ON at time t5 to reset again only the electric charge retaining section FD. Next at time t6, only the transfer transistor M1 is turned ON so that the signal charges remained at the above described temporary reset operation are transferred to the electric charge retaining section FD. The resetting of photodiode PD is thereby effected. In the case such as this of reset by transfer to the electric charge retaining section FD in the condition where some signal electric charges remain at photodiode PD, even an occurrence of trap of signal electric charge for example due to a defect in the path from photodiode PD to the electric charge retaining section FD can be compensated for so that the signal having higher quality is obtained.

Also, while a noise for example due to variance of pixel is generally increased when an amplification device is provided within the pixel, a means for suppressing this may naturally be provided for example within the horizontal read circuit so as to effect a drive accordingly. The construction of the horizontal read circuit is not specifically limited if signals of pixel outputted to the vertical signal line are outputted in time sequence in order of their horizontal arrangement.

Embodiment 2

Figure 12:
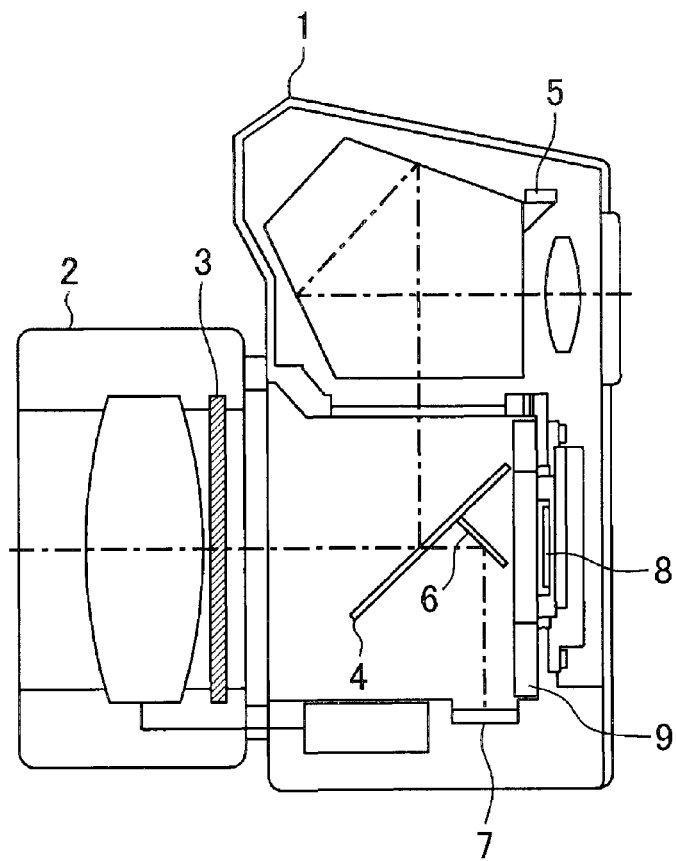
FIG. 12 schematically shows a construction of a general single lens reflex electronic camera which is an example of camera system using the solid-state imaging apparatus according to the invention.

As an example of camera system using the solid-state imaging apparatus according to the invention, a construction of a general single lens reflex type electronic camera will now be schematically described by way of FIG. 12. FIG. 12 includes: 1, a camera body; 2, an imaging optical system; 3, a stop mechanism; 4, a quick return mirror; 5, a photometry section; 6, a focus detection mirror; 7, a focus detecting section; 8, the solid-state imaging apparatus; and 9, a shutter mechanism for controlling the condition of incidence of light onto the solid-state imaging apparatus.

Figure 13:
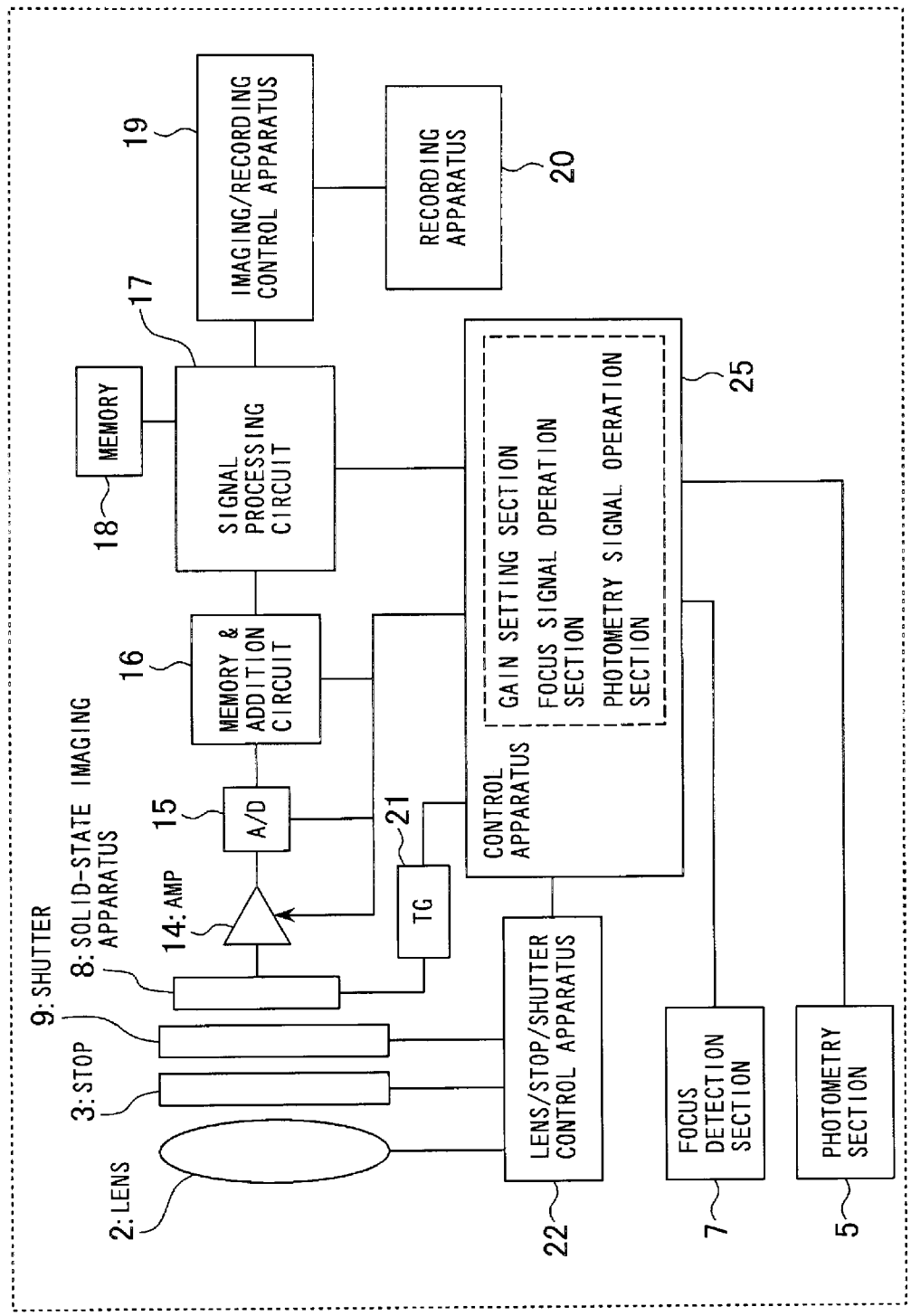
FIG. 13 is a block diagram showing a construction of an embodiment of the imaging system using the solid-state imaging apparatus according to the invention.

FIG. 13 is a block diagram showing as a second embodiment an embodiment of construction of imaging system where the solid-state imaging apparatus according to the invention is used in the electronic camera shown in FIG. 12. FIG. 13 includes: 2, a lens apparatus for taking image; 3, the stop mechanism; 9, the shutter mechanism for controlling the condition of incidence of light onto the solid-state imaging apparatus; 8, the solid-state imaging apparatus; 14, an amplifier for amplifying an output signal of the solid-state imaging apparatus 8 corresponding to the incident light formed into image on a pixel section of the solid-state imaging apparatus 8; 15, an A/D converter for converting amplifier output into digital signal; 16, a memory and addition circuit for temporarily retaining A/D-converted image signal; 17, a signal processing circuit for processing image signals of all pixels retained at the memory and addition circuit 16; 18, a memory apparatus for temporarily storing an image signal processed at the signal processing circuit 17; 19, a control apparatus for image recording which administers the receiving of image made at the signal processing circuit 17 and its recording to a recording apparatus 20. It also includes: 21, TG circuit where drive signals for driving the solid-state imaging apparatus 8 are generated; 22, a lens/stop/shutter control apparatus; 7, the focus detecting section; and 5, the photometry section. What is denoted by 25 is a control apparatus for controlling the imaging system as a whole, which includes a gain setting section, focus signal operation section, photometry signal operation section, etc., and which administers all of the output operation of pixel signal of the solid-state imaging apparatus 8, a gain setting of the amplifier 14, operations of the A/D converter 15 and memory and addition circuit 16, a control of the signal processing circuit 17, etc.

The solid-state imaging apparatus 8 of the imaging system according to the second embodiment is identical to the solid-state imaging apparatus according to the first embodiment shown in FIG. 6, and will not be described in detail. Further, the construction of pixel used in the solid-state imaging apparatus 8 of the present embodiment is identical to the pixel construction shown in FIG. 7, and will not be described in detail.

Figure 14:
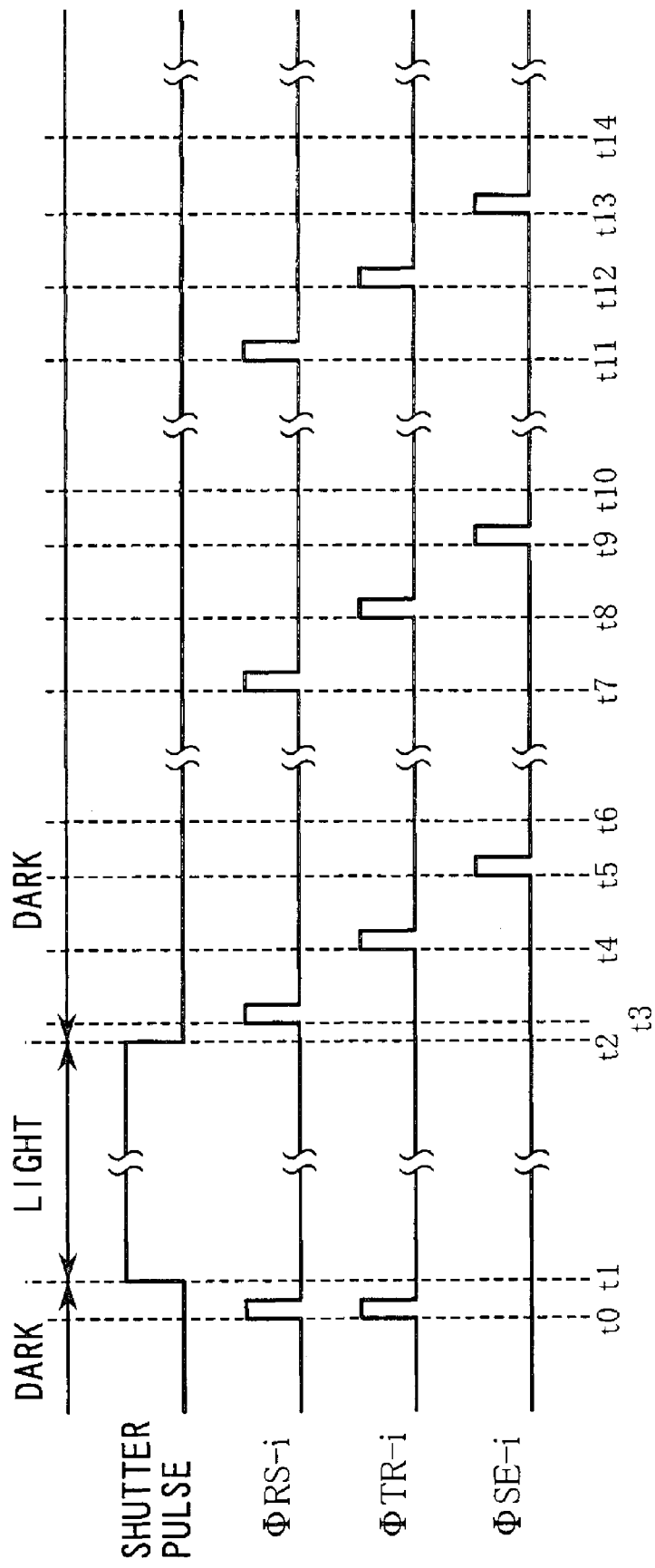
FIG. 14 is a timing chart for explaining an operation of pixel of the solid-state imaging apparatus in the imaging system shown in FIG. 13.
Figure 15A:
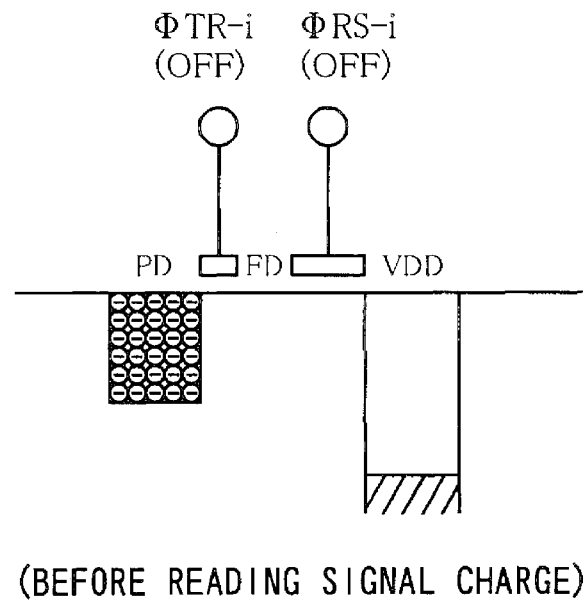
FIGS. 15A and 15B each show potential condition of each section to explain the operation of the pixel of the solid-state imaging apparatus in the imaging system shown in FIG. 14.
Figure 15B:
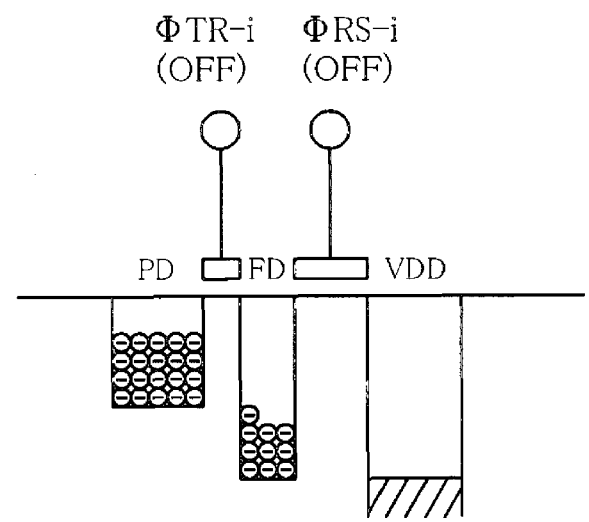

Before describing operation of the imaging system of the present embodiment, an operation of pixel in the solid-state imaging apparatus 8 will now be described with reference to a timing chart shown in FIG. 14 and diagrams showing potential condition of each section of photodiode PD, transfer transistor M1, and reset transistor M2 shown in FIGS. 15A and 15B.

In the solid-state imaging apparatus 8 according to the present embodiment, signal electric charges accumulated at photodiode PD are outputted as pixel signal over a plurality of times. This is the point that is different from the operation of the first embodiment. A description will be given below with respect to a case where the signal charges accumulated at photodiode PD is outputted as pixel signal in three times of operation. Further it is supposed that the incidence of light onto the solid-state imaging apparatus 8 is controlled by the shutter mechanism 9. In FIG. 14, light enters when shutter control pulse is "H" level, and, when it is "L" level, light is cut off. Specifically, light is caused to enter (bright condition) in the period from time t1 to t2, and it is cut off (dark condition) in the other periods.

At first with such light incidence conditions, photodiode PD and the pixel power supply VDD are connected to each other at time t0 in dark condition to reset the photodiode PD by driving reset pulse φRS-i and transfer pulse φTR-i to "H" level. With this operation, the photodiode is cleared of residual electric charges, and it is securely reset. Subsequently, light is caused to enter by controlling the shutter mechanism to start exposure so that signal electric charges generated by light begin to be accumulated at photodiode PD. After passage of a predetermined time, then, the exposure is ended by controlling the shutter mechanism again to attain dark condition (FIG. 15A).

Subsequently, the electric charges accumulated at photodiode PD are outputted as pixel signal over three times. For the first time, reset pulse φRS-i is driven to "H" level at time t3 to reset the electric charge retaining section FD, and transfer pulse φTR-i is subsequently driven to "H" level at time t4 to transfer the signal electric charges accumulated at photodiode PD to the electric charge retaining section FD. Here, since the electric charge accumulation capacitance of the electric charge retaining section FD is smaller as compared to the electric charge accumulation capacitance of photodiode PD, it is impossible to transfer all of the signal electric charges, and electric charges remain at the photodiode PD after the end of the transfer (FIG. 15B).

When select pulse φSE-i is driven to "H" level subsequently at time t5, pixel signal corresponding to the electric charges successfully transferred to the electric charge retaining section FD is outputted onto the vertical signal line 50. At this time, since the pixel signal is fetched to the horizontal signal read circuit 400 through the fetch switch 40, such pixel signal is outputted from the output terminal 401 after time t6. Also in outputting pixel signal of the second time, each transistor within the pixel is controlled similarly to the first time during time t7 to t9, and the pixel signal is outputted from the output terminal 401 after time t10. Similarly in outputting pixel signal of the third time, the pixel is controlled during time t11 to time t13, and the pixel signal is outputted from the output terminal 401 after time t14.

An operation of the solid-state imaging apparatus 8 and the imaging system in the present embodiment will now be described by way of a timing chart of FIG. 16. Also in FIG. 16, a description will be given to the case where the signal electric charges accumulated at photodiode PD are outputted as pixel signal in three times similarly to the description of operation of pixel shown in FIG. 14. Further it is supposed that the incidence of light onto the solid-state imaging apparatus 8 is controlled by the shutter mechanism 9. Also in FIG. 16 similarly to the pixel operation shown in FIG. 14, light enters when shutter control pulse is "H" level, and, when it is "L" level, light is cut off. Specifically, the period from time t1 to t2 is in the condition where light is caused to enter (bright condition) and the other periods are in the condition where it is cut off (dark condition).

At time t0, reset pulse φRS-1 to φRS-m and transfer pulse φTR-1 to φTR-m of all rows are outputted from the vertical scanning circuit 200 so as to reset photodiode PD of all pixels by connecting between the photodiode PD and the pixel power supply VDD of all pixels. With this operation, the photodiode is cleared of residual electric charge and is securely reset similarly to the operation of the solid-state imaging apparatus according to the first embodiment. Subsequently, light is caused to enter at time t1 by controlling the shutter mechanism 9 to start an exposure of all pixels so that signal electric charges generated by light begins to be accumulated at photodiode PD. After passage of a predetermined time, then, the exposure is ended by controlling the shutter mechanism 9 again at time t2 to attain a dark condition.

Next at time t3, reset pulse φRS-1 of the first row is outputted from the vertical scanning circuit 200 to reset the electric charge retaining section FD of the first row. Next at time t4, transfer pulse φTR-1 of the first row is outputted from the vertical scanning circuit 200 to effect the transfer of the first time of the signal electric charges accumulated at photodiode PD of the first row to the electric charge retaining section FD. Subsequently at time t5, select pulse φSE-1 of the first row is outputted from the vertical scanning circuit 200 to output the pixel signals of the first row to the vertical signal line 50. At this time, fetch pulse φT is also concurrently driven to "H" level so that the pixel signals outputted onto the vertical signal line 50 are fetched to the horizontal read circuit 400, and these pixel signals fetched to the horizontal read circuit 400 are outputted from the output terminal 401 in time sequence in order of their horizontal arrangement. In FIG. 16, this signal of the output terminal 401 is represented by Sig, and pixel signal output Sig of the first time of the first row is indicated by (1). The pixel signal outputted from this solid-state imaging apparatus 8 is AD-converted at A/D converter 15 through the amplifier 14 shown in FIG. 13, and is retained at the memory and addition circuit 16.

Next, the output operation of pixel signal of the second time is effected for the first row. Similarly to the operation after time t3 of the first time, rest pulse φRS-1 of the first row, transfer pulse φTR-1 of the first row, and select pulse φSE-1 of the first row are outputted from the vertical scanning circuit 200 after time t6, and fetch pulse φT is driven to "H" at the same timing as the select pulse φSE-1. The pixel signals outputted to the vertical signal line 50 are thereby fetched to the horizontal read circuit 400, and these pixel signals are outputted from the output terminal 401 in time sequence in order of their horizontal arrangement. In FIG. 16, the pixel signal output Sig of the second time is indicated by (2). Similarly to the pixel signal output (1) of the first time, the pixel signal output (2) of the second time is also retained at the memory and addition circuit 16.

After time t7, the output operation of the pixel signals of the third time is also similarly effected to output the pixel signals of the third time from the output terminal 401. In FIG. 16, the pixel signal output Sig of the third time is indicated by (3). The pixel signal output (3) of the third time is also retained at the memory and addition circuit 16 similarly to the pixel signal outputs (1), (2) of the first and second time. At the memory and addition circuit 16, then, those pixel signals corresponding to the three times retained at it are added up and outputted to the signal processing circuit 17 as signal of the first row. In FIG. 16, the signal obtained by addition corresponding to the three times is shown as "memory/addition circuit output". After that, the output operation of pixel signal is effected three times for each row similarly to the first row until m-th row to effect addition of pixel signals corresponding to three times. The pixel signals corresponding to one frame are thereby obtained.

As the above, even when the capacitance of photodiode PD is greater than the capacitance of the electric charge retaining section FD, it is possible to eliminate residual electric charges of photodiode, i.e. afterimage by connecting the photodiode PD to the pixel power supply VDD to reset it after reading the pixel signal. Accordingly, since the area of photodiode can be made larger to a possible extent without being limited by balance with the capacitance of the electric charge retaining section, the solid-state imaging apparatus is obtained as having high sensitivity.

Since, in the present embodiment, the electric charges accumulated at photodiode PD are outputted over a plurality of times and then added up, the amount of electric charges that can be handled as imaging system is increased so that it is possible to obtain an image having higher quality where dynamic range is wide. Further, generally effected in imaging system is to switch a gain of the amplifier 14 shown FIG. 13 (analog gain operation) or to switch a gain on the signals after AD conversion (digital gain operation) correspondingly to the amount of incident light in order to attain a high sensitivity and high dynamic range as the imaging system.

For example, the gain is increased when the incident light amount is small, and by contrast, the gain is lowered when the incident light amount is large. Since the range of pixel signal output that can be handled becomes smaller in the case of small incident light amount, i.e. high gain as the imaging system, the output operation of three times per one row of pixel signal shown in the present embodiment is not necessarily required and it might be possible to obtain the image by one time of pixel signal output operation. Accordingly, a wasted output operation can be omitted to obtain advantages of shorter time and reduced power consumption in the imaging operation by setting a suitable number of times for the pixel signal output operation to be effected per one row in accordance with gain of the imaging system. It should be noted that the present embodiment is similar to the first embodiment in that the reset operation of photodiode PD as shown in the timing chart of FIG. 11 can be effected, and in that the construction of the horizontal read circuit is not specifically limited.

According to the first aspect of the invention as has been described by way of the above embodiments, it is possible to achieve a solid-state imaging apparatus where higher sensitivity without afterimage is possible by making the accumulation capacity of photoelectric conversion device greater than the accumulation capacity of electric charge retaining section, and by executing connection between the photoelectric conversion device and pixel power supply by a reset means after transfer of signal electric charge by a transfer means and before start of exposure. According to the second aspect, since the signal electric charges accumulated at the photoelectric conversion device are read out over a plurality of times and then added up, it is possible to provide an imaging system having wide dynamic range. According to the third aspect, the number of times of transfer of signal charge to the electric charge retaining section and output operation of pixel signal to be effected for a plurality of time is set in accordance with a set gain, making it possible to eliminate the wasted output operation so as to provide an imaging system where it is possible to make time shorter or to reduce power consumption in the imaging operation.

What is claimed is:

1. A solid-state imaging apparatus comprising:
a pixel section having pixels arranged into a matrix, each pixel containing an electric charge retaining section with a first accumulation capacitance for retaining a signal electric charge, a photoelectric conversion device with a second accumulation capacitance greater than said first accumulation capacitance where a light signal is converted into signal electric charges and then accumulated, a transfer means for controlling a transfer of said signal electric charges from said photoelectric conversion device to said electric charge retaining section, a signal amplification means for amplifying said signal electric charges retained at said electric charge retaining section and outputting them as a pixel signal, and a reset means for controlling a connection between said photoelectric conversion device and a pixel power supply;
a horizontal and vertical scanning means for outputting said pixel signal; and
a control section for, after transfer of said signal electric charges by said transfer means, executing the connection between said photoelectric conversion device and said pixel power supply by said reset means before a start of an exposure.

2. An imaging system comprising:
the solid-state imaging apparatus according to claim 1;
a shutter mechanism section for executing a switching of said pixel section between an exposure condition and a light-shielded condition of an object light; and an addition control means for controlling said transfer means in said light-shielded condition to cause the transfer to said electric charge retaining section of signal electric charges accumulated at said photoelectric conversion device at the time of said exposure condition and a output operation of said pixel signal to be effected for a plurality of times for each row and for generating a cumulated pixel signal where said pixel signals outputted over the plurality of times are cumulatively added.

3. The imaging system according to claim 2 further comprising a gain setting means for setting gain on said pixel signal, wherein said addition control means sets in accordance with said set gain the number of times of the transfer of signal electric charges to the electric charge retaining section and output operation of said pixel signal to be effected over said plurality of times.

* * * * *